(12) United States Patent
Cobb (10) Patent No.: US 10,122,009 B2
(45) Date of Patent: Nov. 6, 2018

(54) CO-EXTRUSION PRINT HEAD FOR MULTI-LAYER BATTERY STRUCTURES

(71) Applicant: PALO ALTO RESEARCH CENTER INCORPORATED, Palo Alto, CA (US)

(72) Inventor: Corie Lynn Cobb, Mountain View, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 10 days.

(21) Appl. No.: 15/098,735

(22) Filed: Apr. 14, 2016

(65) Prior Publication Data

US 2016/0226059 A1     Aug. 4, 2016

Related U.S. Application Data

(62) Division of application No. 13/728,016, filed on Dec. 27, 2012, now Pat. No. 9,337,471.

(51) Int. Cl.
*H01M 4/04* (2006.01)
*H01M 10/04* (2006.01)
(Continued)

(52) U.S. Cl.
CPC ............ *H01M 4/0483* (2013.01); *B05C 5/02* (2013.01); *B29C 47/065* (2013.01);
(Continued)

(58) Field of Classification Search
None
See application file for complete search history.

(56) References Cited

U.S. PATENT DOCUMENTS 3,195,865 A    7/1965   Harder
3,382,534 A    5/1968   Veasey
(Continued)

FOREIGN PATENT DOCUMENTS

EP    0802034    10/1997
EP    1757429    2/2007
(Continued)

OTHER PUBLICATIONS

Fergus et al., "Recent Developments in Cathode Materials for Lithium Ion Batteries," Journal of Power Sources, Elsevier SA, Ch. vo. 195, No. 4, Feb. 15, 2010, pp. 939-954, XP026693512.
(Continued)

*Primary Examiner* — Dah-Wei D. Yuan
*Assistant Examiner* — Jose Hernandez-Diaz
(74) *Attorney, Agent, or Firm* — Miller Nash Graham & Dunn LLP (57) ABSTRACT

A co-extrusion print head capable of extruding at least two layers vertically in a single pass having a first inlet port connected to a first manifold, a first series of channels connected to the first inlet port arranged to receive a first fluid from the first inlet port, a second inlet port connected to one of either a second manifold or the first manifold, a second series of channels connected to the second inlet port arranged to receive a second fluid from the second inlet port, a merge portion of the print head connected to the first and second series of channels, the merge portion arranged to receive the first and second fluids, and an outlet port connected to the merge portion, the outlet port arranged to deposit the first and second fluids from the merge portion as a vertical stack on a substrate.

5 Claims, 9 Drawing Sheets

(51) Int. Cl.
  *B29C 47/14*   (2006.01)
  *B05C 5/02*    (2006.01)
  *B29C 47/06*   (2006.01)
  *B29C 47/00*   (2006.01)
  *B29C 47/02*   (2006.01)
  *B29L 31/34*   (2006.01)

(52) U.S. Cl.
  CPC ......... *B29C 47/145* (2013.01); *H01M 4/0411* (2013.01); *H01M 10/0404* (2013.01); *B29C 47/0021* (2013.01); *B29C 47/025* (2013.01); *B29L 2031/3468* (2013.01); *H01M 4/0435* (2013.01)

(56) References Cited

U.S. PATENT DOCUMENTS

| | | | |
|---|---|---|---|
| 3,556,833 A | 1/1971 | Nirenberg | |
| 3,583,678 A | 6/1971 | Harder | |
| 3,752,616 A | 8/1973 | Matsui et al. | |
| 3,860,036 A | 1/1975 | Newman, Jr. | |
| 4,511,528 A | 4/1985 | Kudert et al. | |
| 5,094,793 A | 3/1992 | Schrenk et al. | |
| 5,143,681 A | 9/1992 | Daubenbuchel et al. | |
| 5,154,934 A | 10/1992 | Okamoto | |
| 5,628,950 A | 5/1997 | Schrenk et al. | |
| 5,843,385 A | 12/1998 | Dugan | |
| 5,851,562 A | 12/1998 | Haggard et al. | |
| 5,882,694 A | 3/1999 | Guillemette | |
| 6,109,006 A | 8/2000 | Hutchinson | |
| 6,676,835 B2 | 1/2004 | O'Connor et al. | |
| 6,981,552 B2 | 1/2006 | Reddy et al. | |
| 7,090,479 B2 | 8/2006 | Kegasawa et al. | |
| 7,690,908 B2 | 4/2010 | Guillemette et al. | |
| 7,700,019 B2 | 4/2010 | Lavoie et al. | |
| 7,765,949 B2 | 8/2010 | Fork et al. | |
| 7,780,812 B2 | 8/2010 | Fork et al. | |
| 7,799,371 B2 | 9/2010 | Fork et al. | |
| 7,883,670 B2 | 2/2011 | Tonkovich et al. | |
| 7,922,471 B2 | 4/2011 | Fork et al. | |
| 8,206,225 B2 | 6/2012 | Natarajan | |
| 2002/0074972 A1 | 6/2002 | Narang et al. | |
| 2002/0176538 A1 | 11/2002 | Wimberger-Friedl et al. | |
| 2002/0197535 A1 | 12/2002 | Dudley et al. | |
| 2003/0082446 A1 | 5/2003 | Chiang et al. | |
| 2003/0111762 A1 | 6/2003 | Floyd et al. | |
| 2003/0189758 A1 | 11/2003 | Baer et al. | |
| 2005/0026037 A1* | 2/2005 | Riley, Jr. ................. | H01M 4/38 429/210 |
| 2006/0024579 A1 | 2/2006 | Kolosnitsyn et al. | |
| 2007/0110836 A1 | 5/2007 | Fork et al. | |
| 2007/0279839 A1 | 12/2007 | Miller | |
| 2008/0102558 A1* | 5/2008 | Fork ............... | H01L 31/022425 438/98 |
| 2010/0003603 A1 | 1/2010 | Chiang et al. | |
| 2010/0239700 A1 | 9/2010 | Winroth | |
| 2011/0110836 A1 | 5/2011 | Rong et al. | |
| 2011/0278170 A1 | 11/2011 | Chiang et al. | |
| 2012/0031487 A1 | 2/2012 | Kuang et al. | |
| 2012/0153211 A1 | 6/2012 | Fork et al. | |
| 2012/0156364 A1* | 6/2012 | Fork ..................... | B29C 47/026 427/58 |
| 2014/0099556 A1* | 4/2014 | Johnson ................ | H01M 4/621 429/231.95 |

FOREIGN PATENT DOCUMENTS

| | | |
|---|---|---|
| EP | 2056352 | 5/2009 |
| EP | 2466594 | 6/2012 |
| FR | 1308573 | 11/1962 |
| JP | 9183147 | 7/1997 |
| JP | 2006326891 | 12/2006 |
| WO | 0121688 | 3/2001 |

OTHER PUBLICATIONS

European Search Report, dated Apr. 14, 2014, EP Application No. 13198599.6, 7 pages.

\* cited by examiner

CO-EXTRUSION PRINT HEAD FOR MULTI-LAYER BATTERY STRUCTURES

RELATED APPLICATIONS

This application is a divisional of U.S. patent application Ser. No. 13/728,016, filed on Dec. 27, 2012. The application is also related to US Patent Publication No. 20120156364; US Patent Publication No. 20120153211; U.S. patent application Ser. No. 13/727,937, filed Dec. 27, 2012; U.S. patent application Ser. No. 13/727,960, filed Dec. 27, 2012, now U.S. Pat. No. 9,012,090, issued Apr. 21, 2015; and U.S. patent application Ser. No. 13/727,993, filed Dec. 27, 2012.

BACKGROUND

Battery manufacturing requires disparate processing of the cathode, anode and separator materials. This causes high production costs that remain a barrier to adoption in key electric vehicles and grid storage markets. Conventional lithium ion cell production consists of slurry coating the anode and cathode materials onto the current collectors that may be referred to as foils, typically in separate rooms. They are then calendared, which involves pressing them flat, drying them and re-reeling the foils. The foils are then slit to the size required and re-reeled. During cell assembly, the anode and cathode are subsequently laminated together with the separator material in between and packaged into a can or case during final assembly. This process typically involves 6 or more wind/unwind (reeling) operations, each having their own costs and possible yield losses.

Current methods of multilayer coating typically employ a slot or slide coater. These tools can coat up to 3 layers simultaneously by stacking the dies or distributions plates. However, lower viscosity pastes with lower particulate loading do not have adequate control of layer boundaries. Depending upon the viscosities of the pastes, the dies or print heads used in these methods may also have speed limitations, as discussed in U.S. Pat. No. 7,700,019.

The approach in U.S. Pat. No. 7,700,019 proposes a method of using multi-layer extrusion with slot dies for fabricating vertical layers of electrode material on current collectors with a sheet of polymer electrolyte. This patent discloses slot coating and cannot handle high particulate loading or viscosity of paste that provide better battery structures.

Another approach is disclosed in U.S. Pat. No. 7,799,371 in which a multi-layer metal stack fabricated by individual orifice outlets such that layers of dispensed paste lie on top of each other. In this approach, the materials merge together and form the multi-layer structure outside the printhead. This may cause issues with registration between the layers if the substrate or the print head shifts during deposition.

A co-extrusion print head, as opposed to a slot coater, and a co-extrusion process has been discussed in several US Patents and US Patent Applications. Examples of these types of battery electrodes are discussed in U.S. Pat. Nos. 7,765,949; 7,780,812; 7,922,471; and US Patent Publications 20120156364 and 20120153211. U.S. Pat. No. 7,765,949 discloses a device for extruding and dispensing materials on a substrate, the device has at least two channels for receiving materials and an exit port for extruding the materials onto the substrate. U.S. Pat. No. 7,780,812 discloses another such device having a planarized edge surface. U.S. Pat. No. 7,922,471 discloses another such device for extruding materials that have an equilibrium shape that does not settle after deposition onto the substrate. US Patent Publications 20120156364 and 20120153211 disclose a co-extrusion head that combines streams of two or more materials into an interdigitated structure on a substrate, where there are multiple stripes of the materials. None of these discussions address co-extruding multi-layer structures.

DETAILED DESCRIPTION OF THE EMBODIMENTS

Figure 1:
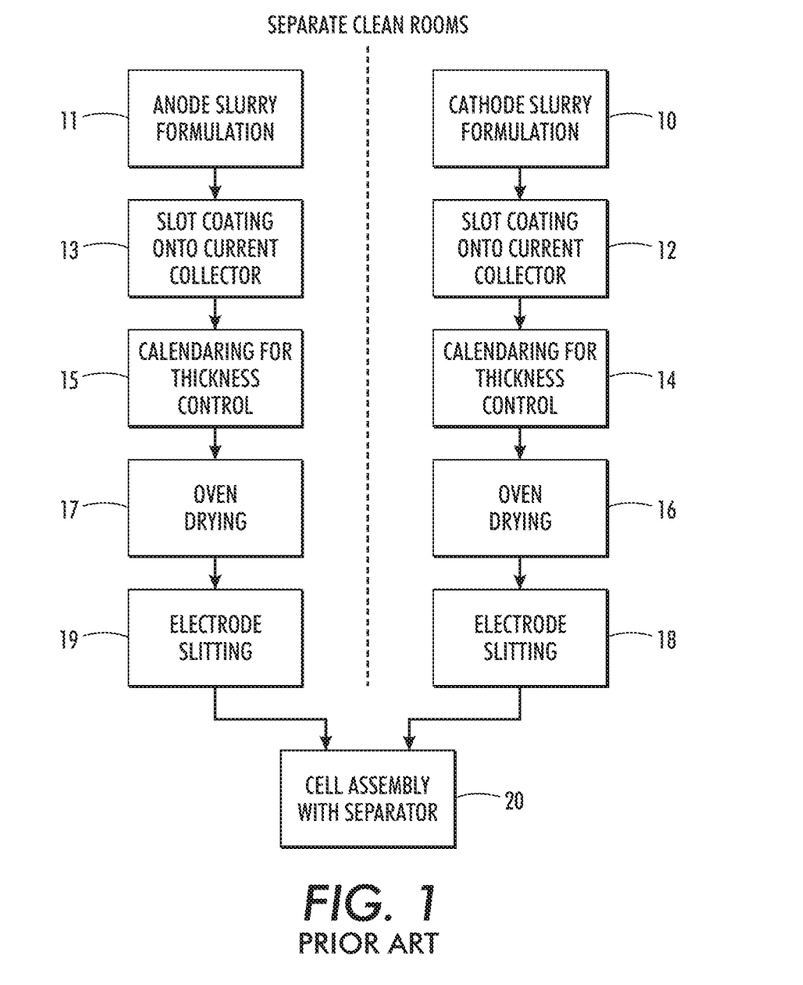
FIG. 1 shows an embodiment of a method of manufacturing batteries in accordance with the prior art.

FIG. 1 shows an example of a process to manufacture batteries. The two processes are very similar but occur in separate clean rooms. For example, the process begins with formation of the cathode or anode slurries at 10 and 11. The current collectors are then unreeled and coated at steps 12 and 13. The coated collectors are then calendared for thickness at 14 and 15. The calendared collectors are then dried at 16 and 17 to remove the solvents. The calendared and dried collectors are then rewound. The collectors are then unwound and slit to the size required for a particular cell at 18 and 19, and then rewound. The foils are then unwound again and laminated together with a separator between them at 20. The finished product is then packaged into a can or case during final cell assembly.

Figure 2:
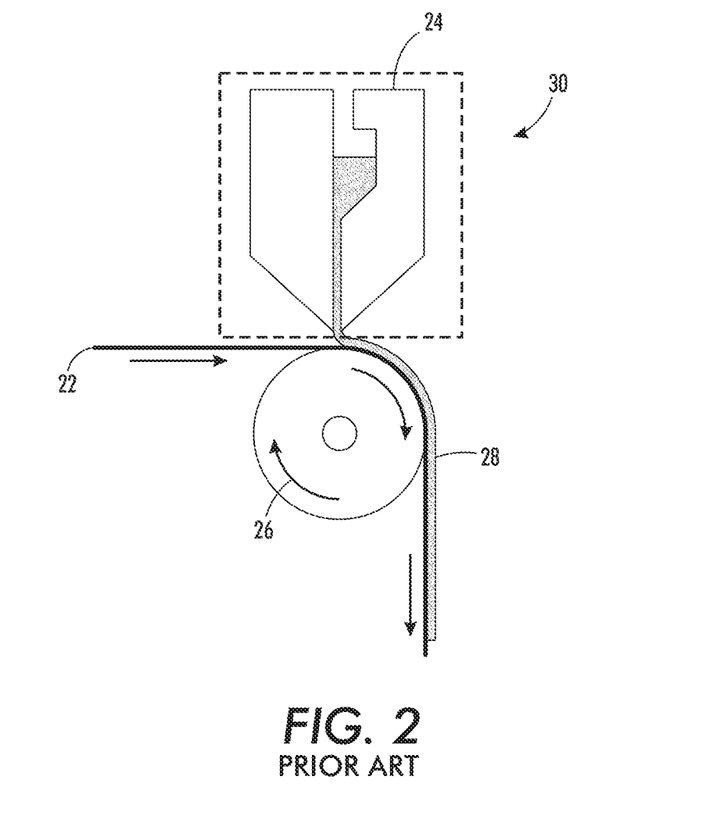
FIG. 2 shows an embodiment of a slot coating system to coat a current collector.

Currently, the preferred method of multilayer coating uses a slot or slide coater in a system 30 shown in FIG. 2. In these systems, a coating head 24 coats the substrate 22 with a material 28 as it passes by a transport roller 26. The slot coater generally deposit single material layers that are thinner with lower viscosity than pastes that have sufficient particle loading to make efficient battery structures. Further, the slot coaters cannot fabricate both electrodes and separator in a single pass from the same print head apparatus, nor can a slot coating machine produce interdigitated cathodes and anodes.

Figure 3:
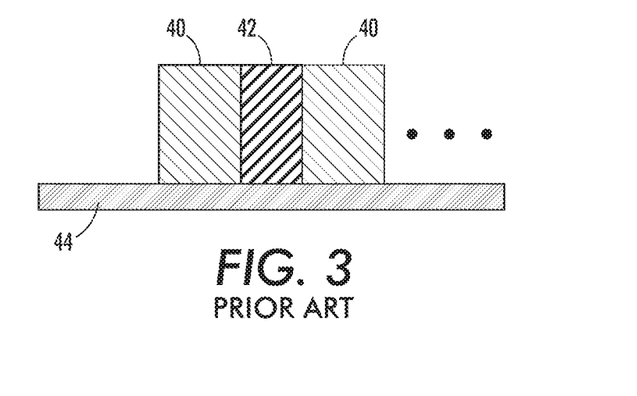
FIG. 3-6 show embodiments of co-extruded materials.

FIGS. 3-6 show embodiments of co-extruded materials. FIG. 3 shows a prior art embodiment of co-extruded materials. The substrate, which may or may not consist of current collector, receives stripes of interdigitated materials 40 and 42. In one embodiment, the material 40 may be the same material or two different materials, one for the cathode and anode, or may consist of the same material. Alternatively, it may be a highly porous material that can be filled with an electrolyte, or a sacrificial material that can be replaced with an electrolyte, as examples. One should note that the materials here will be referred to as fluids, which includes slurries and pastes or any type of material that can be flowed, however slowly, through a print head.

Figure 4:
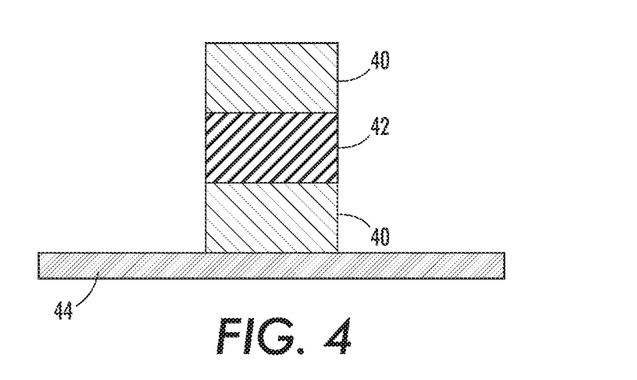

In contrast, the embodiments disclosed here stack the materials vertically, rather than dispensing them side by side. FIG. 4 shows the materials 40 and 42, to demonstrate the differences, stacked vertically on the substrate 44. These materials are deposited simultaneously in one pass from a print head subject to the discussion here. The embodiments of FIGS. 3 and 4 may be of different scales.

Figure 5:
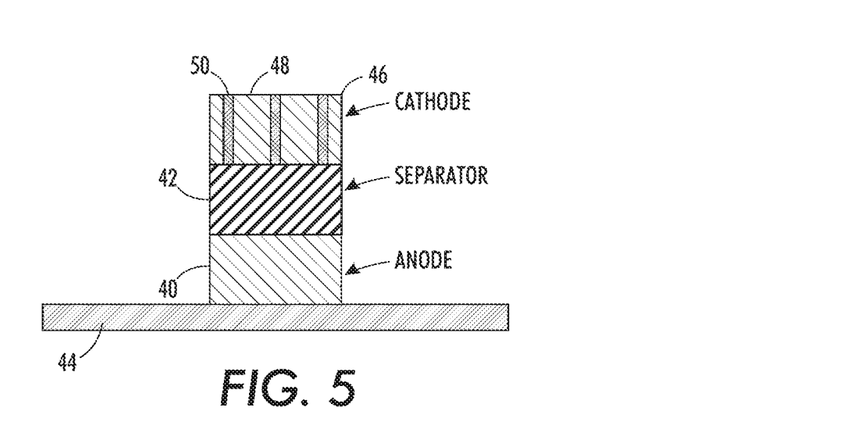

Using this print head, further modifications become possible. FIG. 5 shows a first embodiment of a vertically stacked battery structure having an anode 40, a separator 42, and an interdigitated cathode 46. The interdigitated cathode 46 in this embodiment consists of an active material 48 and an intermediate material 50. The intermediate material 50 may be a sacrificial material that is burned off or otherwise removed and then replaced with a liquid or gel electrolyte. Another possibility is that the material 50 may be a highly porous material that would then be filled with a liquid or gel electrolyte. Other types of materials are of course possible.

Figure 6:
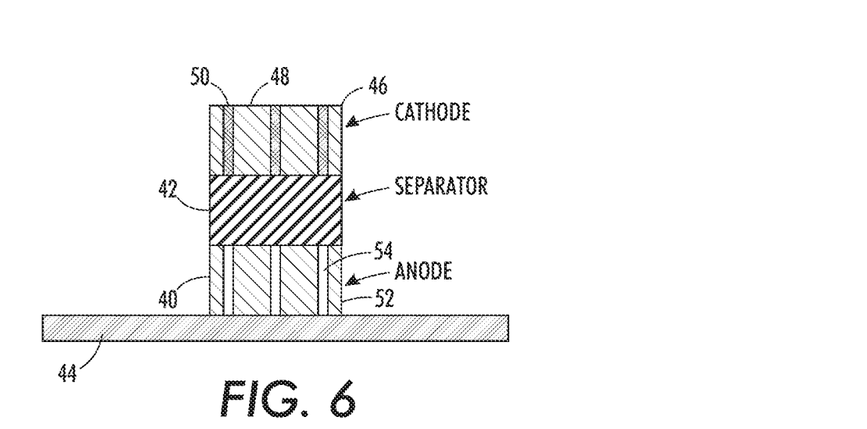

FIG. 6 shows another possible modification of the vertically stacked materials. In this embodiment, both the anode and cathode are interdigitated. The anode 40 consists of interdigitated stripes of an active material 52 and an intermediate material 54. The active material would typically be different than the active material of the cathode, but the intermediate material may be a sacrificial material or a highly porous anode material that would then be filled with a liquid or gel electrolyte. Any aspects of these embodiments may be mixed with aspects of the other embodiments, such as having an interdigitated anode but not an interdigitated cathode, or variations on materials, etc. In addition, the process of manufacturing these structures is far simpler than the process of FIG. 1.

Figure 7:
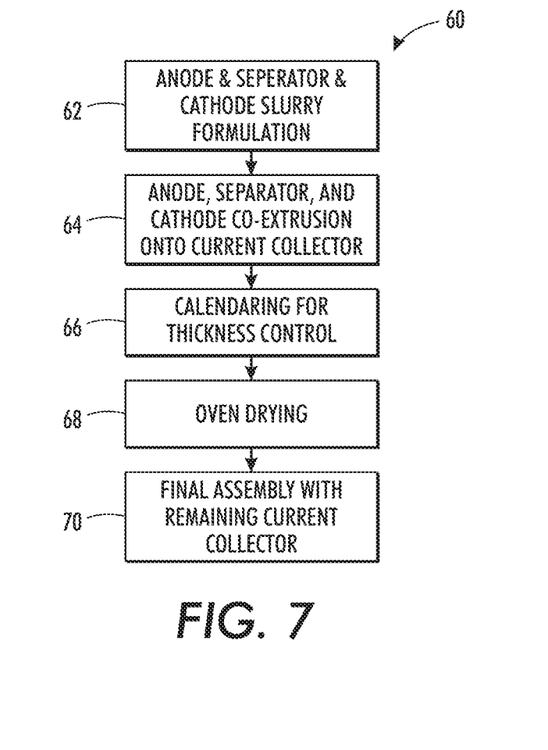
FIG. 7 shows a flowchart of an embodiment of a method of making a vertically stacked battery structure.

FIG. 7 shows an embodiment of a manufacturing process 60 for vertically stacked structures. Similar to the process of FIG. 1, the anode, cathode and separator slurries are formed at 62. A difference here lies in the formation of the separator slurry, since the previous process put the separator sheet in as a final step. In addition, the slurries themselves will typically be different. As mentioned previously, the anode and cathode liquid materials used in slot coating generally have lower viscosity and lower levels of particle loading that the slurries that can be used here. Higher particle loading and viscosities enable different structures that lead to better electrical performance.

At 64, the slurries are loaded into a multi-layer co-extrusion print head and all three materials are deposited onto the substrate in one pass. The substrate in this embodiment would be one of the two current collectors in a battery structure. One should note that the embodiments here are directed to a battery structure having three materials, but more or less than 3 materials could be used, and could be used in structures other than batteries.

Once the materials are deposited onto the substrate, the substrate and materials may be calendared for thickness control at 66. Depending upon the materials and process used, calendaring may not be necessary. The calendared substrate is then dried at 68 to get rid of solvents and other extraneous materials. The resulting structure is then assembled into its final form with the remaining current collector. Again, this is merely one example of one structure that can result from this print head and process.

Figure 8:
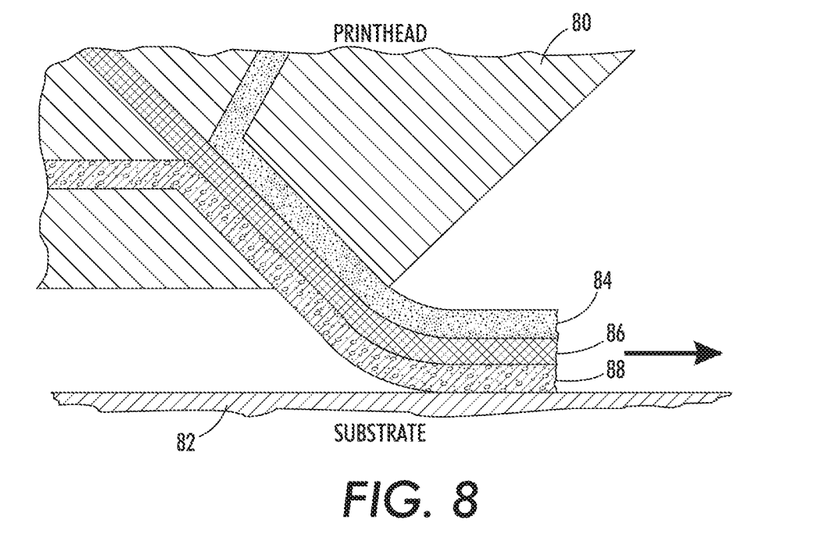
FIG. 8 shows an embodiment of a co-extrusion print head capable of extruding three vertically stacked materials.

FIG. 8 shows an example of such a print head 80. In this embodiment, the print head has 3 material paths, but may employ more or fewer materials. In this example, the print head has a lower material 88 that flows from a first fluid path. A middle material 86 flows from a second fluid path, and a top material 84 flows from a third fluid path. The three materials are deposited in simultaneously onto the substrate 82. One aspect of these embodiments is that the materials are flowed together inside the print head, rather than after the fluids leave the print head. When the materials flow together into their layers outside the print head, there is a tail portion in which the lowest material protrudes from under the middle material, and the middle material will protrude from under the top layer of material. Further, if there is any kind of agitation in the movement of the print head, the layers may lose registration between themselves.

Figure 9:
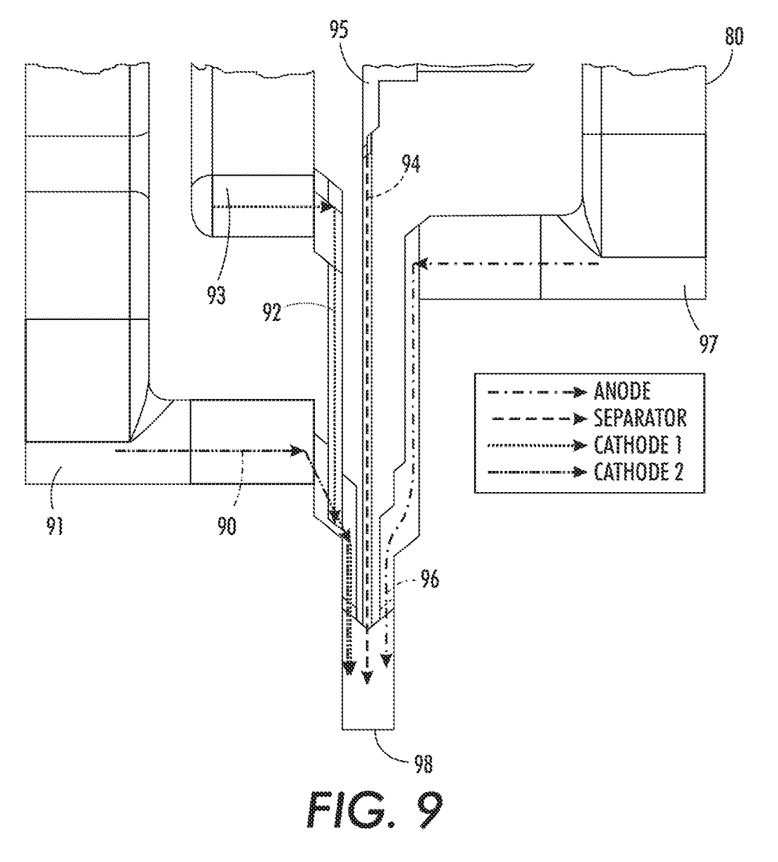
FIG. 9 shows a side view of an embodiment of a co-extrusion print head capable of extruding a vertically stacked battery structure in one pass.
Figure 10:
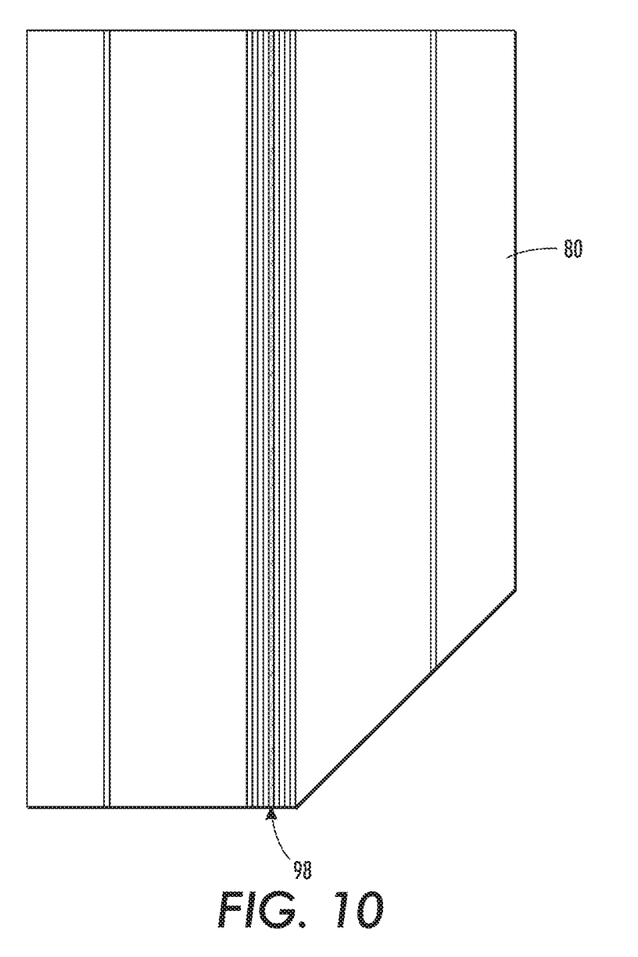
FIG. 10 shows a side view of a fully assembled multi-layer co-extrusion print head.

FIG. 9 shows a side view of an embodiment of a multi-layer co-extrusion print head 80 using four materials, where two of the materials are horizontally interdigitated when the vertically stacked materials are deposited. Materials 90 and 92 are horizontally interdigitated by the flow paths from the inlet ports 91 and 93 to form an interdigitated layer at the exit orifice 98. In one embodiment, this interdigitated layer would form the cathode of a battery structure. The separator material 94 flows from a second flow path and inlet port 95 and the anode material 96 from a third path and inlet port 97. These materials will exit the orifice 98 together to form a vertically stacked structure as seen in FIG. 5. FIG. 10 shows an embodiment of a print head 80 after it has been fully assembled such that one can only see the exit orifice 98.

Figure 11:
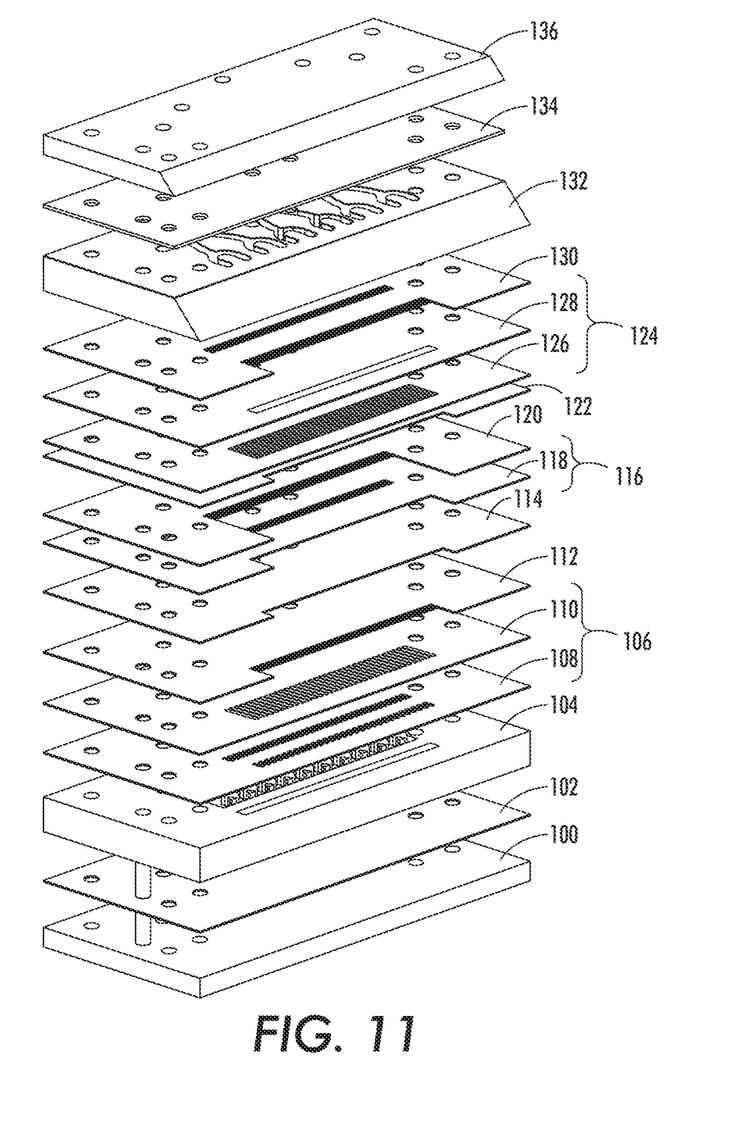
FIG. 11 shows an embodiment of a multi-layer co-extrusion print head consisting of a set of plates.

FIG. 11 shows a particular embodiment of a multi-layer co-extrusion print head. The term 'multi-layer' refers to the resulting stacked structure, although the print head consists of multiple layers. The embodiment here has a first plate 100, which may be referred to a fixture plate. In one embodiment, the fixture plate consists of a steel plate but any rigid material that can put enough pressure on the plates to keep them flat will suffice. A sealing gasket 102 resides next to the fixture plate. The dual side manifold 104 distributes 2 cathode or anode materials to form the interdigitated cathode or anode structure. The sheets or plates in a first subset 106 of the sheets of the print head form fluid channels for the interdigitated cathode or anode. In this embodiment the first set 106 consists of sheets 108, 110 and 112. One should note that while some of this discussion may assume the cathode is produced by the lower sheets, but they could also produce the anode.

Sheet 114 is a merge or transition sheet for the cathode or anode and separator fluids. The sheets in another subset 116, in this case sheets 118 and 120, form the fluid channels for the separator. The separator material merges with the anode material in the channels of sheet 122. The subset of sheets 124, consisting of sheets 126, 128 and 130, provide the fluid channels for the anode. A dual side manifold 132 provides fluid distribution for the anode and the separator. The set of sheets is then sealed on the top with a sealing gasket 134 and a top plate 136. Typically, the set of sheets that form the print head is held together by bolts that can be tightened to ensure sealing of the stack. The registration between the layers is ensured by alignment features on the plates or sheets.

Figure 12:
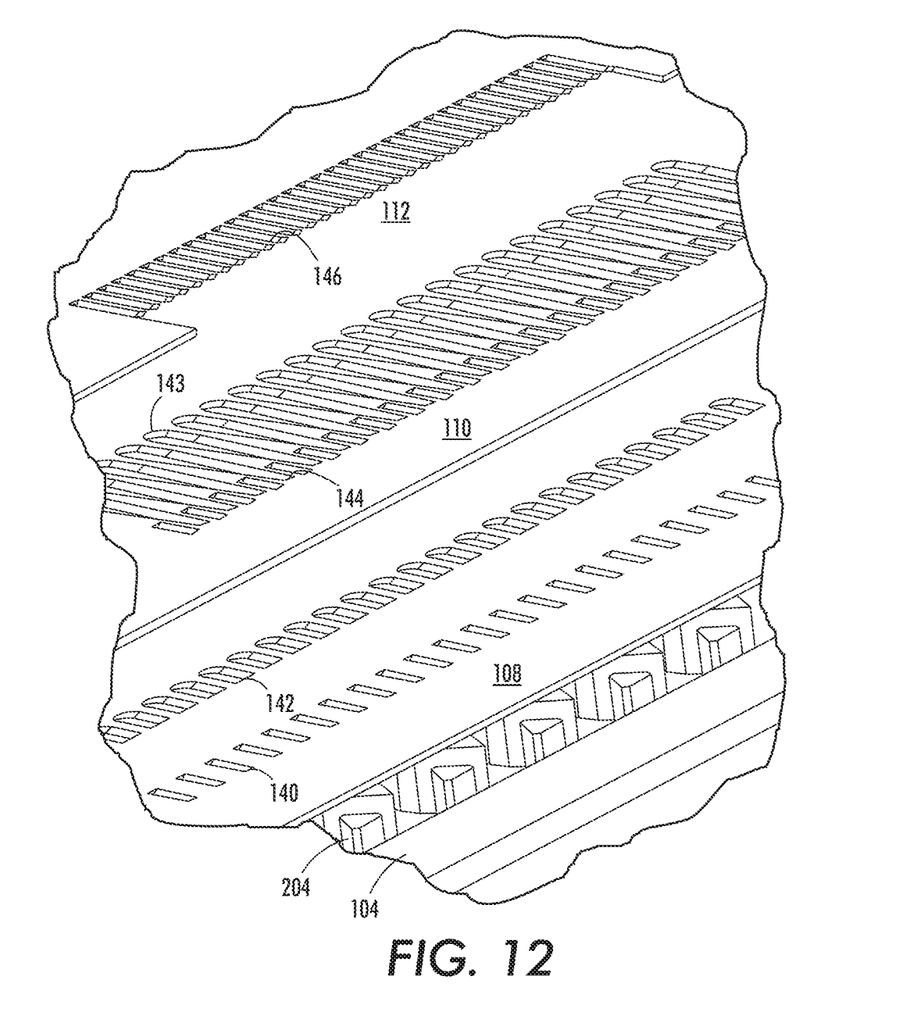
FIG. 12 shows an exploded view of a portion of a multi-layer co-extrusion print head consisting of a set of plates.

FIG. 12 shows an exploded view of one of the subsets of sheets, in this case the subset 106 that combines the two fluids for the cathode or anode that result in an interdigitated cathode or anode. Plate 110 has channels 143 towards the back of the plate, as oriented in the drawing, and plate 108 has channels 142. These channels 142 and 143 take the first cathode material from the manifolds such as 204 in plate 104. Similarly, plate 110 has channels 144 and plate 108 has channels 140. These channels 144 and 140 take the second cathode material from the manifold. Plate 112 has channels 146 that merge the first and second cathode materials into the interdigitated cathode layer. As discussed above, the interdigitated cathode materials then flow up to the merge and transition sheet 114 to merge with the materials from the separator flow path.

Many variations and modifications of the print head are of course possible. One of the possible modifications is that the anode sheets set 124 in FIG. 11 could be replaced with sheets similar to the sheets in set 106 to form an interdigitated anode. An additional distribution path would need to be added to the anode/separator manifold or the cathode manifold, forming a print head that takes in 5 separate fluids and merges them into the battery structure. Another modification would simplify the sheets to a 2 layer structure, meaning that only 2 materials are used to form the structure. This would be accomplished by removing the appropriate sheets and manifolds from the assembly.

In this manner, a structure of vertically stacked materials can be formed on a substrate. The stack may be of two or more layers and the stack may form a battery structure or other types of structures. The layers may consist of one or more layers of interdigitated materials. In one embodiment, the structure is a battery consisting of three layers, an anode, a cathode and a separator. In another embodiment, the cathode consists of two materials interdigitated. In yet another embodiment, the anode consists of two materials interdigitated as well. Regardless of the structure or the number of layers, the resulting structure has vertically stacked layers that are deposited in one pass.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of manufacturing a vertically stacked electrical structure, comprising:
   receiving a first material slurry at a first inlet port in a multi-layer co-extrusion print head comprising a set of plates stacked together, the first inlet port connected to a first manifold and a first series of channels arranged to receive the first material slurry from the first fluid inlet port;
   receiving a second material slurry at a second inlet port in the print head, the second inlet port connected to one of either a second manifold or the first manifold, the second inlet port connected to a second series of channels arranged to receive the second material slurry from the second inlet port;
   receiving a third material slurry at a third inlet port in the print head, a third series of channels connected to the third inlet port arranged to receive the third material slurry from the third inlet port;
   receiving the first material slurry from the first series of channels at a merge portion and receiving the third material slurry from the third series of channels at the merge portion;
   merging the first material slurry and the third material slurry inside the print head to form a horizontally interdigitated layer;
   receiving the second material slurry at the merge portion from the second series of channels, wherein the second series of channels are arranged vertically to the first and third series of channels;
   merging the interdigitated layer and the second material slurry vertically inside the print head; and
   depositing the interdigitated layer and the second material slurry simultaneously onto a substrate in a vertical stack.

2. The method of claim 1, further comprising calendaring the vertical stack.

3. The method of claim 1, wherein depositing the interdigitated layer and the second material slurry comprises depositing at a flow rate sufficient to evenly distribute layers for each material.

4. The method of claim 1, wherein depositing comprises moving the substrate past the multi-layer co-extrusion print head, wherein the print head is fixed in place.

5. The method of claim 1, wherein depositing comprises moving the print head relative to the substrate, wherein the substrate is fixed in place.

* * * * *